United States Patent
Xu

(10) Patent No.: US 10,348,615 B2
(45) Date of Patent: Jul. 9, 2019

(54) METHOD AND APPARATUS FOR PSEUDOWIRE REDUNDANCY

(71) Applicant: Telefonaktiebolaget L M Ericsson (publ), Stockholm (SE)

(72) Inventor: Yuegang Xu, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/778,386

(22) PCT Filed: Mar. 22, 2013

(86) PCT No.: PCT/CN2013/073048
§ 371 (c)(1),
(2) Date: Sep. 18, 2015

(87) PCT Pub. No.: WO2014/146290
PCT Pub. Date: Sep. 25, 2014

(65) Prior Publication Data
US 2016/0072703 A1    Mar. 10, 2016

(51) Int. Cl.
*H04L 12/703* (2013.01)
*H04L 12/46* (2006.01)
(Continued)

(52) U.S. Cl.
CPC .......... *H04L 45/28* (2013.01); *H04L 12/4633* (2013.01); *H04L 45/68* (2013.01); *H04L 12/2859* (2013.01); *H04L 12/4641* (2013.01)

(58) Field of Classification Search
CPC .................................................. H04L 45/68
See application file for complete search history.

(56) References Cited

U.S. PATENT DOCUMENTS 7,715,310 B1    5/2010  Sajassi et al.
8,650,286 B1*   2/2014  Sajassi .................. H04L 45/586
                                                          370/389
(Continued)

FOREIGN PATENT DOCUMENTS

CN    101291288 A    10/2008
CN    101595691 A    12/2009
CN    101902353 A1   12/2010

OTHER PUBLICATIONS

Machine Translation of CN 101902353 A.*
(Continued)

*Primary Examiner* — Kevin M Cunningham
(74) *Attorney, Agent, or Firm* — Sage Patent Group

(57) ABSTRACT

Methods and apparatuses for PW redundancy have been provided. A network node across a first domain and a second domain is disclosed. In each domain, the network node and at least one second network node form a first redundancy group (RG) in the first domain and a second RG in the second domain. The network node comprises a first set of interfaces facing the first domain, a second set of interfaces facing the second domain, and a forwarder. In the first set, at least a first and a second interfaces are configured for connecting with PW segments within the first domain; in the second set, at least a first and a second interfaces are configured for connecting with PW segments within the second domain. A third interface in the first set and a third interface in the second set are configured for transferring traffic between the network node and the at least one second network node and between the first domain and the second domain. The forwarder is configured for forwarding traffic selectively between one interface of the first set and one interface of the second set.

16 Claims, 5 Drawing Sheets

(51) Int. Cl.
  *H04L 12/721*   (2013.01)
  *H04L 12/28*    (2006.01)

(56) References Cited

U.S. PATENT DOCUMENTS

2010/0238795 A1*  9/2010  Boutros .................. H04L 45/00
                                                        370/219
2012/0219004 A1    8/2012  Balus et al.
2012/0263453 A1* 10/2012  Cohn ................... H04B 10/032
                                                        398/5

OTHER PUBLICATIONS

PCT Notification of Transmittal of the International Search Report and the Written Opinion of the International Searching Authority, or the Declaration for International application No. PCT/CN2013/073048, dated Jan. 2, 2014.
Pseudowire Redundancy; Internet Engineering Task Force (IETF); Request for Comments: 6718 by P. Muley et al., Aug. 2012.
Inter-Chassis Communication Protocol for L2VPN PE Redundancy; Internet Engineering Task Force by Martini et al., Jul. 30, 2012.
Pseudowire Preferential Forwarding Status Bit by Praveen Muley, Ed., et al. (Network Working Group), Sep. 14, 2012.
Psuedowire Redundancy on S-PE by J. Dong and H. Wang (Network Working Group), Nov. 22, 2012.
Requirements for Multi-Segment Pseudowire Emulation Edge-to-Edge (PWE3) by N. Bitar, Ed., et al. (Network Working Group), Oct. 2008.

\* cited by examiner

US 10,348,615 B2

METHOD AND APPARATUS FOR PSEUDOWIRE REDUNDANCY

PRIORITY

This nonprovisional application is a U.S. National Stage Filing under 35 U.S.C. § 371 of International Patent Application Serial No. PCT/CN2013/073048, filed Mar. 22, 2013, and entitled "METHOD AND APPARATUS FOR PSEUDOWIRE REDUNDANCY."

TECHNICAL FIELD

Embodiments of the present invention generally relates to communication systems, and more particularly to network nodes, methods, and a computer-readable storage media for redundancy in Multi-Segment Pseudowire (MS-PW).

BACKGROUND

This section introduces aspects that may help to facilitate a better understanding of the invention(s). Accordingly, the statements of this section are to be read in this light and are not to be understood as admissions about what is in the prior art or what is not in the prior art.

Pseudowires (PWs) are deployed in the packet switch network (PSN) because it allows a service provider to extend the reach of Pseudowire (PW) across multiple domains. These pseudowires are called multi-segment pseudowires (MS-PWs). These domains can be autonomous systems under one provider administrative control, Interior Gateway Protocol (IGP) areas in one autonomous system, different autonomous systems under the administrative control of two or more service providers, or administratively established pseudowire domains. In reference 1, N. Bitar, Ed., "Requirements for Multi-Segment Pseudowire Emulation Edge-to-Edge (PWE3)", RFC5254, Oct. 2008, architecture and use cases of MS-PW have been discussed.

The solution of MS-PW resiliency should allow for the protection of a PW segment, a contiguous set of PW segments, as well as the end-to-end path. Reference 1 has also discussed the requirements for MS-PW resiliency.

The most used solution is the protection of end-to-end path. The protection entity is deployed in the terminating-provider edge (T-PE) node.

In some MS-PW scenario, there are some benefits to provide PW redundancy on switching-provider edge (S-PE) node, such as reducing the burden on the access T-PE nodes, and faster protection switching. In reference 2, J. Dong, and H. Wang, "Pseudowire Redundancy on S-PE", draft-dong-pwe3-redundancy-spe-04, Nov. 22, 2012, some scenarios in which PW redundancy is provided on S-PEs are described, and the operations of the S-PEs are specified.

FIG. 1 shows the MS-PW redundancy on S-PE with S-PE protection. Terminating provider edges T-PE1 and T-PE2/T-PE3 provide PW Emulation Edge-to-Edge service to customer edges CE1 and CE2. These PEs may reside in different PSN or pseudowire domains. PWs are used to connect the Attachment circuits (ACs) attached to T-PE1 to the corresponding ACs attached to T-PE2 and T-PE3. Each PW on a PSN tunnel is switched to a PW in the tunnel at switching provider edges S-PE1/S-PE2 to complete the MS-PW between T-PE1 and T-PE2/T-PE3. S-PE1/S-PE2 is therefore the PW switching point. An S-PE switches an MS-PW from one segment to another based on the PW identifiers.

As illustrated in FIG. 1, CE1 is connected to T-PE1 while CE2 is dual-homed to T-PE2 and T-PE3. T-PE1 is connected to S-PE1 and S-PE2, and both S-PE1 and S-PE2 are connected to T-PE2 and T-PE3. There are two MS-PWs which are switched at S-PE1 and S-PE2 respectively to provide S-PE node protection. For MS-PW1, the S-PE1 provides resiliency using PW1-Seg2 and PW1-Seg3. For MS-PW2, the S-PE2 provides resiliency using PW2-Seg2 and PW2-Seg3. MS-PW1 is the working PW and PW1-Seg2 is the working PW segment.

However, both solutions have the following limitations. First, one PW failure within one PSN will trigger the switchover behaviour within other PSNs. It is not preferred if they are administrated by different operators. Second, one failure in AC link may trigger multiple switching behaviours in PSN domains. For example, in FIG. 1, the interface between T-PE2/T-PE3 and CE2 are Synchronous Transport Module level-1 (STM-1). Multi-chassis Automatic Protection Switching (MC-APS) or Multiplex Section Protection (MSP) is deployed in T-PE2 and T-PE3. One failure in AC link (between T-PE2 and CE2) will cause the switching behaviour in up to 63 PW instances if Structure-Agnostic Time Division Multiplexing (TDM) over Packet (SAToP) is deployed and one PW can only hold one E-carrier (E1) traffic.

Except mentioned above, the protection of end-to-end path further has the following drawbacks. Protection switching may be slower in some scenarios. The failure notification should be transmitted to the T-PEs. Then T-PEs can negotiate each other to perform the switching. The path may be long in some cases. It will result in the slow protection switching.

SUMMARY

To better address one or more of the above concerns, in a first aspect of the invention, a network node is provided. The network node is across a first domain and a second domain. The network node and at least one second network node form a first redundancy group in the first domain and a second redundancy group in the second domain. The network node comprises: a first set of interfaces facing the first domain; a second set of interfaces facing the second domain; and a forwarder. In the first set of interfaces, at least a first and a second interfaces are configured for connecting with pseudowire (PW) segments within the first domain; and in the second set of interfaces, at least a first and a second interfaces are configured for connecting with PW segments within the second domain. A third interface in the first set of interfaces and a third interface in the second set of interfaces are configured for transferring traffic between the network node and the second network node and between the first domain and the second domain. The forwarder is configured for forwarding traffic selectively between one of the first set of interfaces and one of the second set of interfaces.

In some embodiments, the network node is operated in a master-slave mode within the first redundancy group or the second redundancy group, and preferential forwarding statuses of the first set of interfaces and the second set of interfaces are determined based on a role of the network node configured as Master or Slave in the corresponding redundancy group.

In further embodiments, the preferential forwarding statuses of the first and second interfaces in the first set of interfaces are set as active when the network node is configured as Master in the first redundancy group, and set as standby when the network node is configured as Slave in the first redundancy group; the preferential forwarding statuses of the first and second interfaces in the second set of interfaces are set as active when the network node is configured as Master in the second redundancy group, and set as standby when the network node is configured as Slave in the second redundancy group; and the preferential forwarding status of the third interface in the first set of interfaces is opposite to the preferential forwarding statuses of the first and second interfaces in the first set of interfaces, and the preferential forwarding status of the third interface in the second set of interfaces is opposite to the preferential forwarding status of the first and second interfaces in the second set of interfaces.

In some embodiments, a PW segment between an interface of the network node and an interface of a remote network node is determined as working status if the preferential forwarding status of the interface of the network node and the preferential forwarding status of the interface of the remote network node are both active.

In some embodiments, in response to a fault of a PW segment in working status, the network node is configured to exchange its role with one of the at least one second network node in a same domain where the PW segment is located.

In some embodiments, in response to a fault of the network node, the network node is configured to set its role as Slave both in the first and second redundancy groups, causing one of the at least one second network node to be Master in the first or the second redundancy group.

In some embodiments, the network node is a switching-provider edge (S-PE) device.

In a second aspect of the invention, a network node is provided. The network node is across a first domain and a second domain. The network node and at least one second network node form a first redundancy group in the first domain and a second redundancy group in the second domain. The network node comprises: a first set of interfaces facing the first domain; a second set of interfaces facing the second domain; and a forwarder. In the first set of interfaces, at least a first interface is configured for connecting with a link within the first domain; and in the second set of interfaces, at least a first and a second interfaces are configured for connecting with PW segments within the second domain. A second interface in the first set of interfaces and a third interface in the second set of interfaces are configured for transferring traffic between the network node and the second network node and between the first domain and the second domain. The forwarder is configured for forwarding traffic selectively between one of the first set of interfaces and one of the second set of interfaces.

In some embodiments, the network node is operated in a master-slave mode within the first redundancy group or the second redundancy group, and preferential forwarding statuses of the first set of interfaces and the second set of interfaces are determined based on a role of the network node configured as Master or Slave in the corresponding redundancy group.

In further embodiments, the preferential forwarding statuses of the first interface in the first set of interfaces is set as active when the network node is configured as Master in the first redundancy group, and set as standby when the network node is configured as Slave in the first redundancy group; the preferential forwarding statuses of the first and second interfaces in the second set of interfaces are set as active when the network node is configured as Master in the second redundancy group, and set as standby when the network node is configured as Slave in the second redundancy group; and the preferential forwarding status of the third interface in the first set of interfaces is opposite to the preferential forwarding statuses of the first and second interfaces in the first set of interfaces, and the preferential forwarding status of the third interface in the second set of interfaces is opposite to the preferential forwarding status of the first and second interfaces in the second set of interfaces.

In some embodiments, a PW segment between an interface of the network node and an interface of a remote network node is determined as working status if the preferential forwarding status of the interface of the network node and the preferential forwarding status of the interface of the remote network node are both active.

In some embodiments, in response to a fault of a PW segment or a link in working status, the network node is configured to exchange its role with one of the at least one second network node in a same domain where the PW segment or the link is located.

In some embodiments, in response to a fault of the network node, the network node is configured to set its role as Slave both in the first and second redundancy groups, causing one of the at least one second network node to be Master in the first or the second redundancy group.

In some embodiments, the network node is a terminating-provider edge (T-PE) device. The first domain is Attachment circuit (AC) domain.

In a third aspect of the invention, a method for MS-PW redundancy is provided. The method provides the redundancy on network nodes according to the first and second aspects of the invention.

Particular embodiments of the subject matter described in this specification can be implemented so as to realize one or more of the following advantages.

With particular embodiments of the techniques described in this specification, a novel PW redundancy has been provided on T-PE and S-PE. Upon failure, it is possible that the switchover behavior is done within one domain or two domains. It is flexible to deploy MS-PW across multiple operators. Further, switchover is faster than end-to-end protection mechanism because the protection is done within one PSN or two PSNs. It is possible to protect the traffic against more than one failure if only one failure happens within one PSN domain at the same time. In addition, it is possible to protect the AC link failure within the AC domain. Thus, the AC link failure will not trigger switchover behavior in multiple associated PW instances in PSN domains.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification.

Figure 1:
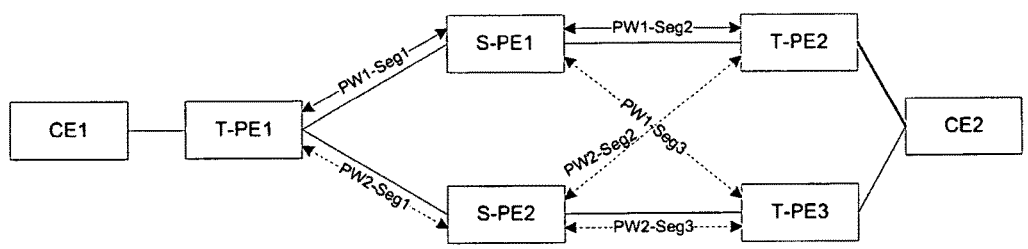
FIG. 1 shows the MS-PW redundancy on S-PE with S-PE protection.
Figure 2:
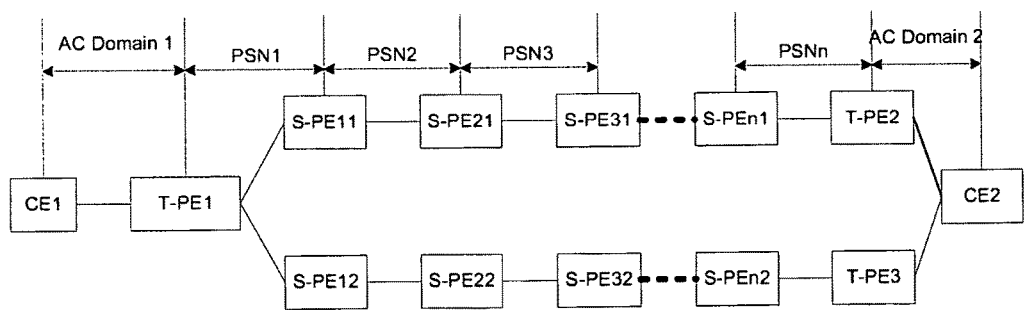
FIG. 2 illustrates an exemplary scenario where embodiments of the present invention may be applied.

FIG. 2 illustrates an exemplary scenario where embodiments of the present invention may be applied.

As shown in FIG. 2, the whole network can be divided into a set of domains, i.e., AC domain 1, PSN1, PSN2, . . . , PSNn, and AC domain 2. PW service has been provided to CE1 and CE2 across the set of domains. Each of T-PE and S-PE nodes is cross two domains. PW segment is set up between two PE devices, T-PEs and/or S-PEs.

According to the proposed redundancy mechanism, protections have been provided both on S-PE and T-PE nodes. As illustrated in FIG. 2, CE1 is connected to T-PE1 while CE2 is dual-homed to T-PE2 and T-PE3. T-PE1 is connected to S-PE11 and S-PE12, and both S-PE11 and S-PE12 are connected to S-PE21 and S-PE22, and so on. Finally, S-PEn1 and S-PEn2 are connected to T-PE2 and T-PE3. There are two MS-PWs (not shown in FIG.2) which are switched at each pair of S-PEs (e.g., S-PE11 and S-PE12, S-PE21 and S-PE22, etc.) respectively to provide S-PE node protection.

One aim of the design is that failure within one PW segment should be protected within this domain. The failure should not trigger the protection in other domains. For example, PW segment failure within PSN2 must be protected internally. Other domains (PSN1, PSN3, etc.) will not be aware of it. Only the edge node (for example S-PE or T-PE) failure should be protected by two associated domains. For example, the failure of S-PE21 node should be fixed by the cooperation of PSN2 and PSN3.

In the following, the proposed redundancy mechanism will be described in the context of 1:1 protection where one specific subset of a path for an emulated service, consisting of a protection PW and/or AC, protects another specific subset of a path for the emulated service. User traffic is transmitted over only one specific subset of the path at a time. However, the principle described herein may be applied in N:1 protection after adaptive adjustment. In the N:1 protection, N specific subsets of paths for an emulated, consisting of protection PWs and/or ACs, protect another specific subset of the path for the emulated service. User traffic is transmitted over only one specific subset of the path at a time.

Figure 3:
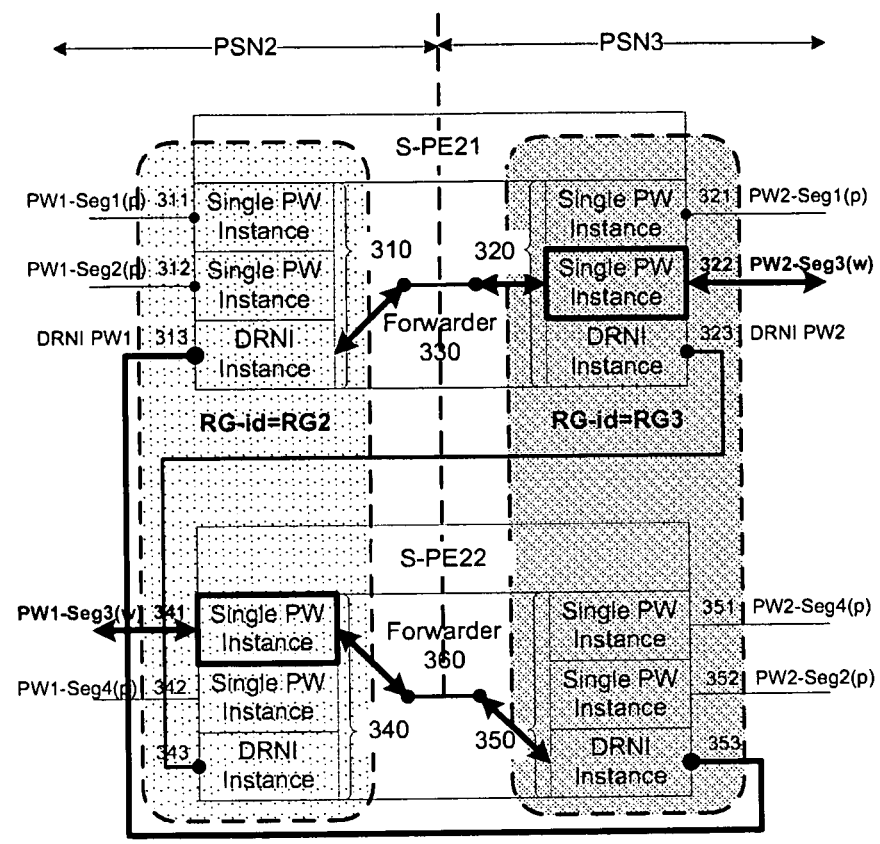
FIG. 3 illustrates an exemplary architecture of a S-PE device according to embodiments of the present invention.

FIG. 3 illustrates an exemplary architecture of an S-PE device according to embodiments of the present invention.

To provide protection, two or more S-PE nodes (e.g., S-PE21 and S-PE22) form a redundancy group (RG). In a RG, S-PE nodes operate in Master-Slave mode, i.e., one S-PE can be selected as Master or Slave.

S-PE is the border node between a first domain and a second domain. For example, as shown in FIG. 3, S-PE21 is across PSN2 and PSN3 domains, and S-PE22 is also across PSN2 and PSN3 domains. Within each domain, a first S-PE (e.g. S-PE21) and a second S-PE (e.g. S-PE22) are members of the associated or corresponding RG. Therefore, one S-PE node can belong to two separate RGs. Also, it is possible that the S-PE node is selected as Master in one RG and as Slave in the other RG.

RG can be described as [PSN-id, RG-id], where PSN-id defines which PSN the RG belongs to, and RG-id defines the RG in the context of PSN. For example in FIG. 3, S-PE21 and S-PE22 form a first RG [PSN2, RG2] in the first domain PSN2, and form a second RG [PSN3, RG3] in the second domain PSN3.

S-PE21 may comprise a first set of interfaces 310 facing the first domain (e.g., PSN2), a second set of interfaces 320 facing the second domain (e.g., PSN3), and a forwarder 330.

In the first set of interfaces 310, at least a first interface 311 and a second interface 312 are configured for connecting with PW segments, e.g., PW1-Seg1 and PW1-Seg2, within the first domain. Each interface corresponds to a single PW instance and thus these interfaces may be referred to as single PW instance interface.

In the second set of interfaces 320, at least a first interface 321 and a second interface 322 are configured for connecting with PW segments, e.g., PW2-Seg1 and PW2-Seg3, within the second domain. Also, each interface corresponds to a single PW instance and thus there interfaces may be referred to as single PW instance interface.

As mentioned above, it is possible that one S-PE node is selected as Master in one RG and as Slave in the other RG. In this regard, traffic should be transferred between the S-PE node and its peer S-PE node. Distributed Resilient Network Interconnect (DRNI) technology is introduces in S-PE nodes for this purpose.

Specifically, a third interface 313 in the first set of interfaces 310 and a third interface 323 in the second set of interfaces 320 are configured for transferring traffic between S-PE21 and S-PE22 and also between the first domain (PSN2) and the second domain (PSN3). These interfaces 313 and 323 may be referred to as DRNI instance interface.

In the example shown in FIG. 3, there are two DRNI PWs. One (DRNI PW1) is between the DRNI instance interface 313 of S-PE21 and the DRNI instance interface 353 of S-PE22, and the other (DRNI PW2) is between the DRN1 instance interface 323 of S-PE21 and the DRNI instance interface 343 of S-PE22. The DRNI instance interfaces may be connected by hardwires. Of course, other manners may be used to connect the DRNI instance interfaces.

The forwarder 330 in S-PE21 is configured for forwarding traffic from one PW segment selectively on the ingress PSN-facing interface (e.g., the first set of interfaces 310) to one PW segment selectively on the egress PSN-facing interface (e.g., the second set of interfaces 320).

Each interface has its preferential forwarding status. The preferential forwarding statuses of the first set of interfaces 310 and the second set of interfaces 320 are determined based on a role of S-PE21 configured as Master or Slave in the corresponding RG.

Specifically, the preferential forwarding statuses of the first 311 and second 312 interfaces in the first set of interfaces 310 are set as Active when S-PE21 is configured as Master in the first RG [PSN2, RG2], and set as Standby when S-PE21 is configured as Slave in the first RG [PSN2, RG2].

The preferential forwarding statuses of the first 321 and second 322 interfaces in the second set of interfaces 320 are set as Active when S-PE21 is configured as Master in the second RG [PSN3, RG3], and set as Standby when S-PE21 is configured as Slave in the second RG [PSN3, RG3].

The preferential forwarding status of the third interface 313 in the first set of interfaces 310 is opposite to the preferential forwarding statuses of the first 311 and the second 312 interfaces in the first set of interfaces 310; and the preferential forwarding status of the third interface 323 in the second set of interfaces 320 is opposite to the preferential forwarding statuses of the first 321 and the second 322 interfaces in the second set of interfaces 320.

The signaling of the preferential forwarding statuses of these interfaces may be implemented by Preferential Forwarding bit defined for redundant PWs between their termination points. This bit indicates a preferential forwarding status with a value of Active or Standby for each interface in the S-PE node.

For those single PW instance interfaces, if the S-PE is selected as Master in one RG, it will advertise "Active Preferential Forwarding status bit" to associated PW segments. Else, it will advertise or inform "Standby Preferential Forwarding status bit" to associated PW segments. However, for the DRNI instance interfaces, if the S-PE is selected as Master in one RG, it will advertise "Standby Preferential Forwarding status bit" on the associated DRNI PW. Else, it will advertise "Active Preferential Forwarding status bit" on the associated DRNI PW.

For example, in FIG. 3, S-PE21 is configured as Slave and S-PE22 is configured as Master in the first RG [PSN2, RG2], and S-PE21 is configured as Master and S-PE22 is configured as Slave in the second RG [PSN3, RG3]. S-PE21 will advertise "Standby Preferential Forwarding status bit" to PW segments associated with the single PW instance interfaces 311 and 312 in the first RG, i.e., PW1-Seg1 and PW1-Seg2. S-PE21 will also advertise "Active Preferential Forwarding status bit" to DNRI PW segment associated with the DRNI instance interface 313 in the first RG, i.e., DRNI PW1. Similarly, for the second RG, S-PE21 will advertise "Active Preferential Forwarding status bit" to associated PW segments, i.e., PW2-Seg1 and PW2-Seg3, and advertise "Standby Preferential Forwarding status bit" to DRNI PW associated with the DRNI instance interface 323 in the second RG, i.e., DRNI PW2.

Also, S-PE22 will advertise the preferential forwarding statuses of its interfaces accordingly. Then, by matching the preferential forwarding statuses of DRNI instance interfaces of both S-PE21 and S-PE22, one working DRNI PW therebetween can be determined. In the example shown in FIG. 3, S-PE21 is configured as Slave and S-PE22 is configured as Master in the first RG [PSN2, RG2], and S-PE21 is configured as Master and S-PE22 is configured as Slave in the second RG [PSN3, RG3]. Thus, S-PE21 will advertise "Active Preferential Forwarding status bit" to DNRI PW segment associated with the DRNI instance interface 313 in the first RG, i.e., DRNI PW1, and advertise "Standby Preferential Forwarding status bit" to DRNI PW associated with the DRNI instance interface 323 in the second RG, i.e., DRNI PW2. Similarly, S-PE22 will advertise "Standby Preferential Forwarding status bit" to DNRI PW segment associated with the DRNI instance interface 343 in the first RG, i.e., DRNI PW2, and advertise "Active Preferential Forwarding status bit" to DRNI PW associated with the DRNI instance interface 353 in the second RG, i.e., DRNI PW1. Therefore, by matching the preferential forwarding statuses of DRNI instance interfaces of both S-PE21 and S-PE22, the DRNI PW1 connected the DRNI instance interface 313 of S-PE21 and the DRNI instance interface 353 of S-PE22 is determined as working status and used to forward the traffic.

The forwarder always selects the payload from the active interface in one domain to the active interface in another domain. The real packet path is shown in bold line in FIG. 3 supposing PW1-Seg3 and PW2-Seg3 are determined as working PW segments. In FIG. 3, the working PW segments are indicated by "(w)" following the name of the PW segment, and other protection PW segments are indicated by "(p)" following the name of the PW segment.

Returning to FIG. 2, a local S-PE is connected with a remote network node, S-PE or T-PE. The remote S-PE also has the same architecture as the local S-PE, which is described in FIG. 3. The architecture of T-PE has a similar architecture, which will be described later with reference to FIG. 4. Thus, all the network nodes will advertise the preferential forwarding statuses of their interfaces on associated PW segments. A PW segment between an interface of a local network node and an interface of a remote network node is determined as working status and used for traffic forwarding if the preferential forwarding status of the interface of the local network node and the preferential forwarding status of the interface of the remote network node are both active. Otherwise, the PW segment is determined as protection status.

Proposed architecture of S-PE thus has been discussed with referent to FIG. 3. Although the above description is discussed mainly with respect to S-PE21, its peer S-PE22 has the same architecture. Further, the skilled in the art should appreciate that, the number of the interfaces in S-PE node is illustrative, which may vary depending on network architecture and the employed protection mechanism (e.g., 1:1 protection or N:1 protection).

Figure 4:
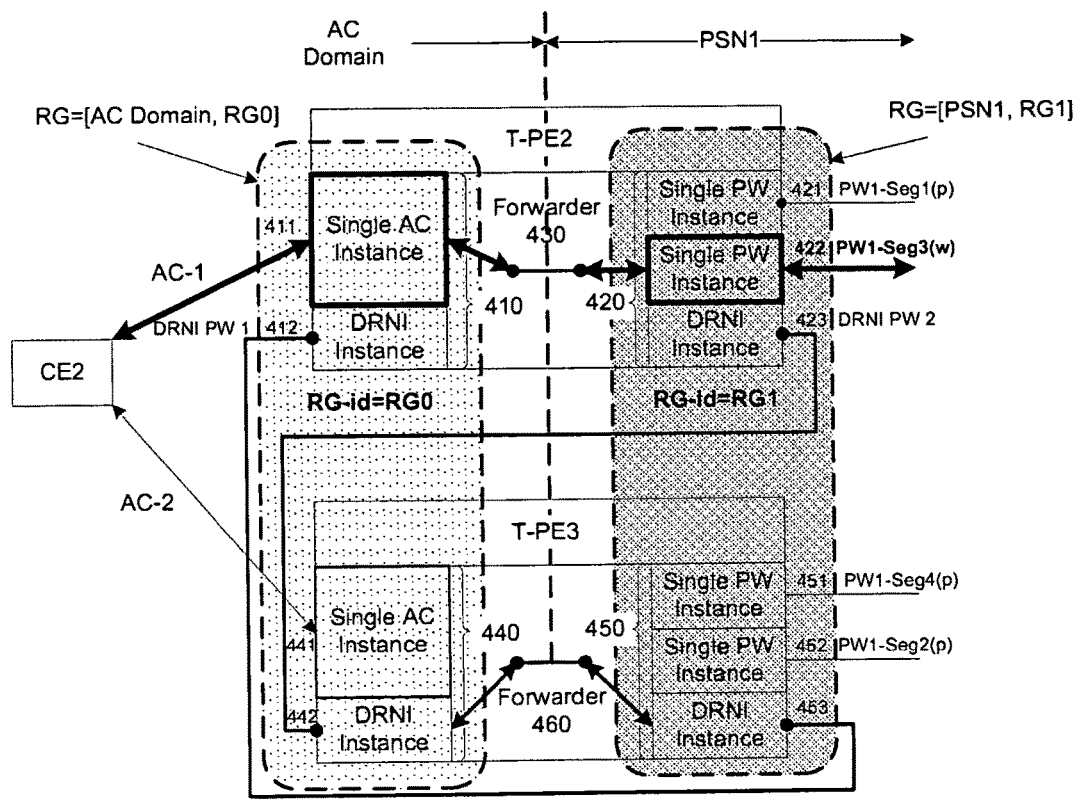
FIG. 4 illustrates an exemplary architecture of a T-PE device according to embodiments of the present invention.

FIG. 4 illustrates an exemplary architecture of a T-PE device according to embodiments of the present invention. The architecture of T-PE node is very similar to that of S-PE node, and thus the same portions are omitted or briefed hereinafter. The difference is in that, a T-PE node is between an AC domain and a PSN domain, while an S-PE node is between two PSN domains. An attachment circuit (AC) is the physical or virtual circuit attaching a customer edge (CE) to a provider edge (PE). CE is a device where one end of a service originates and/or terminates. For example, CE may be an access router. FIG. 4 shows the scenario where a CE (e.g., CE2) is dual-homed.

T-PE is the border node between a first domain and a second domain. For example, as shown in FIG. 4, T-PE2 is across AC domain and PSN1 domain, and T-PE3 is also across AC domain and PSN1 domain. The concept of RG can still be applied in AC domain. Within each domain, a first T-PE (e.g. T-PE2) and a second T-PE (e.g. T-PE3) are members of the associated RG. Therefore, one T-PE node can belong to two separate RGs.

For example in FIG. 4, T-PE2 and T-PE3 form a first RG [AC Domain, RG0] in the AC domain, and form a second RG [PSN1, RG1] in the second domain PSN1.

T-PE2 may comprise a first set of interfaces 410 facing the first domain (e.g., AC domain), a second set of interfaces 420 facing the second domain (e.g., PSN1), and a forwarder 430.

In the first set of interfaces 410, at least a first interface 411 is configured for connecting with a link, e.g., AC-1 link, within the AC domain. The first interface 411 corresponds to a single AC instance and thus this interface may be referred to as single AC instance interface.

In the second set of interfaces 420, at least a first 421 and a second 422 interfaces are configured for connecting with PW segments, e.g., PW1-Seg1 and PW1-Seg3, within the second domain (e.g., PSN1). Also, each interface corresponds to a single PW instance and thus there interfaces may be referred to as single PW instance interface.

DRNI instance interfaces are also introduced in T-PE nodes. Specifically, a second interface 412 in the first set of interfaces 410 and a third interface 423 in the second set of interfaces 420 are configured for transferring traffic between T-PE2 and T-PE3 and also between the first domain (AC domain) and the second domain (PSN1).

There are two DRNI PWs in the example shown in FIG. 4. One is between the DRNI instance interface 412 of T-PE2 and the DRNI instance interface 453 of T-PE3, and the other is between the DRNI instance interface 423 of T-PE2 and the DRNI instance interface 442 of T-PE2.

Compared with FIG. 3, it can be seen that, unlike the RG in PSN domain, there is only one DRNI instance interface and one AC instance interface in the RG [AC Domain, RG0]. Further, the role of T-PE in the RG [AC Domain, RG0] should be aligned with the status of the associated AC instance. For example, FIG. 4 shows that at the beginning, AC-1 link and PW1-Seg3 segment are used for traffic forwarding.

Each interface has its preferential forwarding status. The preferential forwarding statuses of the first set of interfaces 410 and the second set of interfaces 420 are determined based on a role of T-PE2 configured as Master or Slave in the corresponding RG.

Specifically, the preferential forwarding statuses of the first interface 411 (i.e., AC instance interface) in the first set of interfaces 410 is set as Active when T-PE2 is configured as Master in the first RG [AC domain, RG0], and set as Standby when T-PE2 is configured as Slave in the first RG [AC domain, RG0].

The preferential forwarding statuses of the first 421 and second 422 interfaces in the second set of interfaces 420 are set as Active when T-PE2 is configured as Master in the second RG [PSN1, RG1], and set as Standby when T-PE2 is configured as Slave in the second RG [PSN1, RG1].

The preferential forwarding status of the second interface 412 (i.e., DRNI instance interface) in the first set of interfaces 410 is opposite to the preferential forwarding statuses of the first interface 411 in the first set of interfaces 410; and the preferential forwarding status of the third interface 423 in the second set of interfaces 420 is opposite to the preferential forwarding statuses of the first 421 and the second 422 interfaces in the second set of interfaces 420.

The signaling of the preferential forwarding statuses of these interfaces may be also implemented by Preferential Forwarding bit. This bit indicates a preferential forwarding status with a value of Active or Standby for each interface in the T-PE node.

Proposed architecture of T-PE thus has been discussed with referent to FIG. 4. Although the above description is discussed mainly with respect to T-PE2, its peer T-PE3 has the same architecture. Further, the skilled in the art should appreciate that, the number of the interfaces in T-PE node is illustrative, which may vary depending on network architecture and the employed protection mechanism (e.g., 1:1 protection or N:1 protection). For example, one T-PE may connect with more than one CEs.

Following, process flows will be described with respect to a normal case and several failure cases in order to illustrate the proposed redundancy mechanism.

Figure 5:
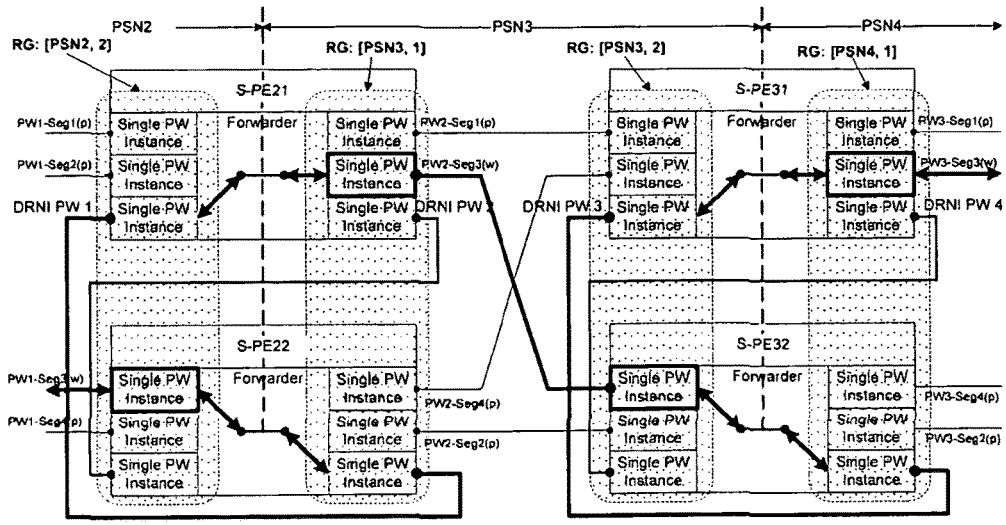
FIG. 5 illustrates an exemplary normal case according to embodiments of the present invention.

FIG. 5 illustrates an exemplary normal case according to embodiments of the present invention. Four S-PE devices are shown for example, wherein S-PE21 and S-PE22 are local S-PE nodes across PSN2 and PSN3 domains, and S-PE31 and S-PE32 are remote S-PE nodes across PSN3 and PSN4 domains. The skilled in the art should appreciate that, the process between T-PE and S-PE nodes are similar.

In each RG within one PSN domain, one S-PE is configured as Master and the other as Slave. The initial configuration in FIG. 5 is as blow.

In RG [PSN2, 2], S-PE22 is Master and S-PE21 is Slave. In RG [PSN3,1], S-PE21 is Master and S-PE22 is Slave. In RG [PSN3,2], S-PE32 is Master and S-PE31 is Slave. In RG [PSN4,1], S-PE31 is Master and S-PE32 is Slave.

Based on the roles of the S-PE nodes in each RG, preferential forwarding statuses of the interfaces in these S-PE nodes are advertised to associated PW segments or DNRI PW. In the example shown in FIG. 5, PW2-Seg3 is selected as working PW segment to forward the traffic by matching the local and remote preferential forwarding statuses. DRNI PW1 and DRNI PW3 are determined to forward the traffic by comparing the local and remote preferential forwarding status. The forwarders in the S-PE nodes forward the payload elements selectively from one active PW to one active PW. The packet path is shown in bold line in FIG. 5.

Figure 6:
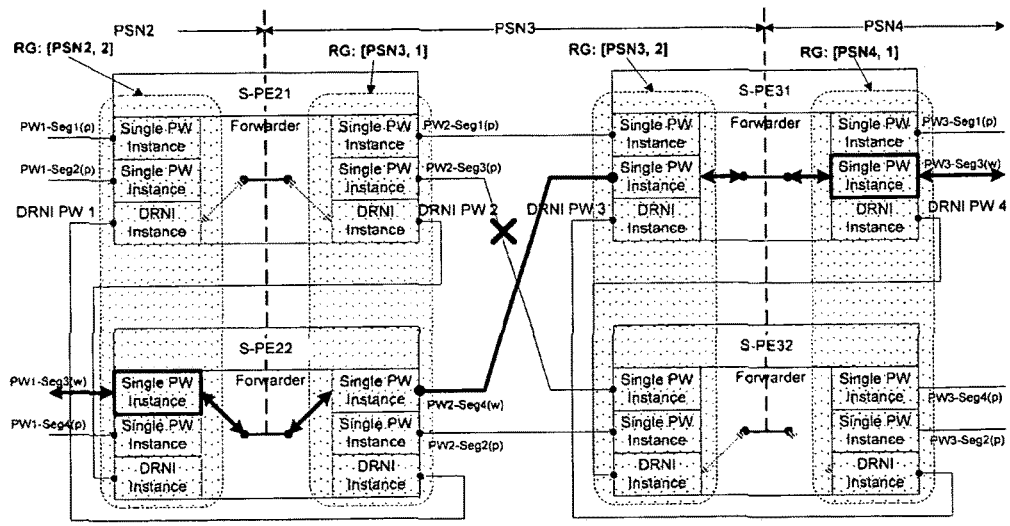
FIG. 6 illustrates an exemplary PW segment failure case according to embodiments of the present invention.

FIG. 6 illustrates an exemplary PW segment failure case according to embodiments of the present invention. The configuration in FIG. 6 is the same as in FIG. 5, except that the failure of the working PW segment (PW2-Seg3) is detected by S-PE21 and S-PE32.

In response to a fault of a PW segment in working status, the associated S-PE node will exchange its role with its peer S-PE node in a same domain where the PW segment is located. Inter-chassis communication protocol (ICCP) can be used to enable PE (T-PE/S-PE) device redundancy. The protocol runs within a set of two or more PEs, forming a redundancy group, for the purpose of synchronizing data amongst the systems. It accommodates multi-chassis attachment circuit as well as pseudowire redundancy mechanisms. The details about ICCP may reference to Luca Martini, et al, "Inter-Chassis Communication Protocol for L2VPN PE Redundancy," IETF Internet Draft, draft-ictf-pwc3-iccp-09, Jul. 30, 2012.

As shown in FIG. 6, there is a fault or error on the working PW segment, PW2-Seg3, the associated S-PE, i.e., S-PE21 and S-PE32 will change their roles to the Slave in the corresponding RG. S-PE22 will become the Master in the RG [PSN3,1], and S-PE31 will become the Master in the RG [PSN3,2] accordingly. Then, S-PE22 will advertise "Active Preferential Forwarding status bit" to PW segments associated with its single PW instance interfaces facing PSN3, i.e., PW2-Seg2 and PW2-Seg4, and advertise "Standby Preferential Forwarding status bit" to DRNI PW associated with its DRNI instance interface facing PSN3, i.e., DRNI PW1, while S-PE21 will advertise "Standby Preferential Forwarding status hit" to PW segments associated with its single PW instance interfaces facing PSN3, i.e., PW2-Seg1 and PW2-Seg3, and advertise "Active Preferential Forwarding status bit" to DRNI PW associated with its DRNI instance interface facing PSN3, i.e., DRNI PW2. Meanwhile, at the remote nodes, S-PE31 will advertise "Active Preferential Forwarding status bit" to PW segments associated with its single PW instance interface facing PSN3, i.e., PW2-Seg1 and PW2-Seg4, and advertise "Standby Preferential Forwarding status bit" to DRNI PW associated with its DRNI instance interface facing PSN3, i.e., DNRI PW3, while S-PE32 will advertise "Standby Preferential Forwarding status bit" to PW segments associated with its single PW instance interfaces facing PSN3, i.e., PW2-Seg1 and PW2-Seg3, and advertise "Active Preferential Forwarding status bit" to DRNI PW associated with its DRNI instance interface facing PSN3, i.e., DRNI PW4. Therefore, by matching the preferential forwarding statuses of the interfaces facing PSN3 in the local nodes and in the remote nodes, PW2-Seg4 is determined as working PW segment for traffic forwarding.

From the PW segment failure case, it can be seen that the failure is fixed within the PSN3 domain and it will not impact the traffic within PSN2 and PSN4 domains.

Figure 7:
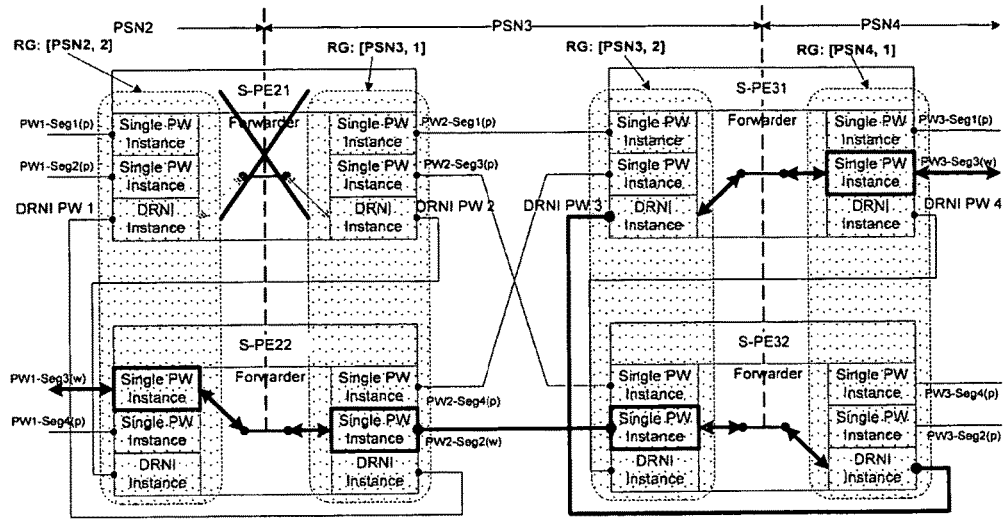
FIG. 7 illustrates an exemplary S-PE node failure case according to embodiments of the present invention.

FIG. 7 illustrates an exemplary S-PE node failure case according to embodiments of the present invention. The configuration in FIG. 7 is the same as in FIG. 5, except that the failure occurs on the S-PE node, e.g., S-PE21.

In response to a fault of an S-PE node, the S-PE node is configured to set its role as Slave in both associated RG, causing its peer S-PE node to be Master in the two RGs by e.g. ICCP.

As shown in FIG. 7, S-PE21 is down. The failure will trigger its peer S-PE node, i.e., S-PE22 to be the Master PE in the RG [PSN3, 1]. In the RG [PSN2,2], S-PE22 is still the Master PE as it does before the S-PE21 failure. S-PE22 will advertise the "Active Preferential Forwarding bit" to PW2-Seg4 and PW2-Seg2. PW2-Seg2 will become the working PW segment. If S-PE21 is the Master PE in the RG [PSN2, 2], the PW switchover will also happen in PSN2 as it does in PSN3.

From the S-PE node failure case, it can be seen that the failure is fixed within two possible associated domains, i.e., PSN2 and PSN3, and it will not impact the traffic within other domains in the whole MS-PW.

Although the failure cases in FIGS. 6 and 7 are illustrated with respect to S-PE nodes, T-PE node can execute protection mechanism similarly.

Figure 8:
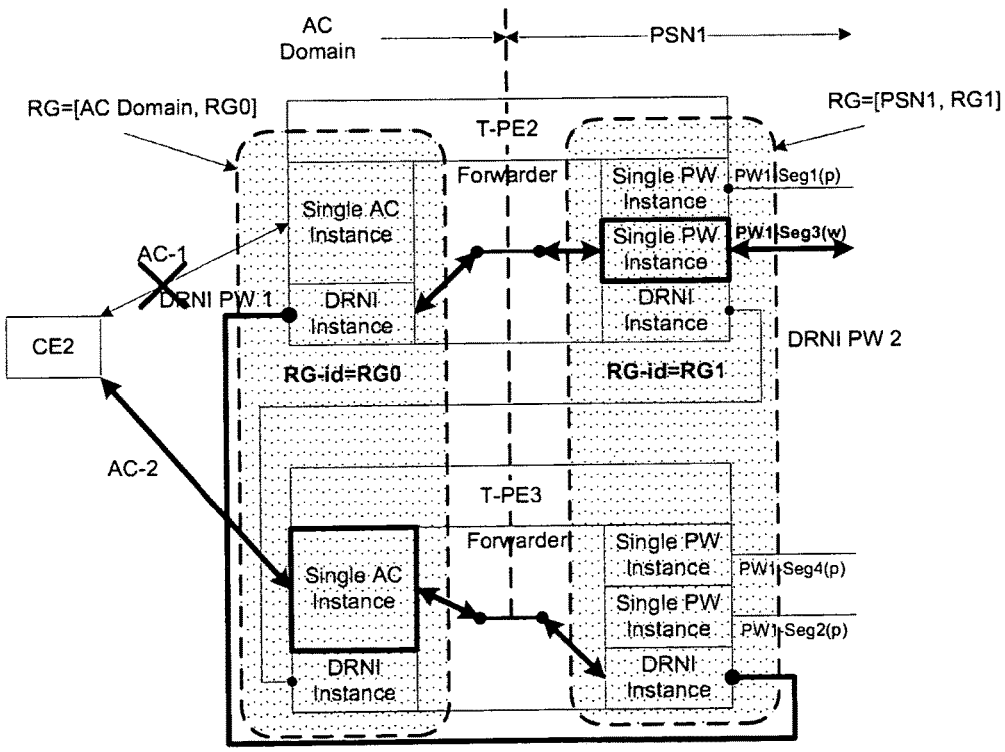
FIG. 8 illustrates an exemplary AC link failure case according to embodiments of the present invention.

FIG. 8 illustrates an exemplary AC link failure case according to embodiments of the present invention.

As shown in FIG. 8, T-PE2 and T-PE3 are between the AC domain and PSN1 domain. In the AC domain, T-PE2 and T-PE3 form a RG [AC Domain, RG0]; in the PSN1 domain, T-PE2 and T-PE3 form a RG [PSN1, RG1]. Initially, in the RG [AC Domain, RG0], T-PE2 is configured as Master and T-PE3 is configured as Slave. In the RG [PSN1, RG1], T-PE2 is configured as Master and T-PE3 is configured as Slave. In the AC domain, AC-1 link is used for traffic forwarding, and in the PSN1 domain, PW1-Seg3 is used for traffic forwarding.

In response to a fault of a link in working status, the associated T-PE node will exchange its role with its peer T-PE node in a same domain where the link is located.

As shown in FIG. 8, AC-1 link associated with T-PE2 is down and AC-2 is used for traffic forwarding. The failure will trigger its peer T-PE node, i.e., T-PE3 to be the Master PE in the RG [AC Domain, RG0]. At the same time, T-PE2 will advertise the "Active Preferential Forwarding status bit" to associated DRNI PW, i.e., DRNI PW1, because T-PE2 becomes the Salve PE in the RG [AC Domain, RG0].

By matching the received Preferential Forwarding status bit from the peer T-PE3, DRNI PW1 is configured as working status. The forwarder in each T-PE will react accordingly. Specifically, the forwarder in T-PE3 will forward traffic from AC-2 link on the single AC instance interface to DRNI PW1 on the DRNI instance interface facing PSN1, and the forwarder in T-PE2 will forward traffic from DRNI PW1 on the DRNI instance interface facing the AC Domain to PW1-Seg3 on the single PW instance interface facing PSN1. Finally, the traffic is still forwarded through the PW1-Seg3 as before.

From the AC link failure case, it can be seen that the AC link failure is protected within the AC domain, and it will not impact the traffic within other domains in the whole MS-PW.

Above thus has described exemplary embodiments of the present invention with reference to device diagrams and failure case process flows. As seen from the above description, the proposed redundancy mechanism has following advantages. Upon failure, switchover is faster than end-to-end protection mechanism because the protection is done within one domain or two domains. Also due to it, it is flexible to deploy MS-PW across multiple operators. Further, it is possible to protect the traffic against more than one failure if only one failure happens within one PSN domain at the same time. In addition, it is possible to protect the AC link failure within the AC domain. Thus, the AC link failure will not trigger switchover behavior in multiple associated PW instances in PSN domains.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A system comprising:
   a first network node across a first domain and a second domain; and
   at least one second network node across the first domain and the second domain, wherein the first network node and the at least one second network node form a first redundancy group in the first domain and a second redundancy group in the second domain,
   wherein said first network node comprises:
      a first set of interfaces facing the first domain;
      a second set of interfaces facing the second domain; and
      a forwarder,
   wherein in the first set of interfaces, at least a first interface and a second interface are configured for connecting with pseudowire (PW) segments within the first domain;
   wherein, in the second set of interfaces, at least a first interface and a second interface are configured for connecting with PW segments within the second domain;
   wherein a third interface in the first set of interfaces facing the first domain is configured to couple to an interface of the at least one second network node that faces the second domain for transferring traffic between said network node and said at least one second network node and between the first domain and the second domain along a first path;
   wherein a third interface of the second set of interfaces facing the second domain is configured to couple to an interface of the at least one second network node that faces the first domain for transferring traffic between said first network node and said at least one second network node between first domain and the second domain along a second path; and
   wherein said forwarder is configured for forwarding traffic selectively between one of the first set of interfaces and one of the second set of interfaces,
   wherein while the PW segments coupled to first and second interfaces in the second set of interfaces of the first network node are active:
      the first network node is configured to operate as a Master node in the second redundancy group with respect to the second domain and a Slave node in the first redundancy group with respect to the first domain, and
      the second network node is configured to operate as a Slave node in the second redundancy group with respect to the second domain and a Master node in the first redundancy group with respect to the first domain,
   wherein in response to a fault or error on one of the PW segments coupled to the first or second interfaces in the second set of interfaces of the first network node:
      the first network node is configured to:
         change from operation as the Master node in the second redundancy group with respect to the second domain to operation as the Slave node in the second redundancy group with respect to the second domain;
         advertise that the third interface in the second set of interfaces facing the second domain has changed to active; and
         advertise that the first and second interfaces in the second set of interfaces facing the second domain have changed to standby; and
         receive an advertisement that
      the second network node is configured to:
         change from operation as the Slave node in the second redundancy group with respect to the second domain to operation as the Master node in the second redundancy group with respect to the second domain; and
         advertise that at least one interface facing the second domain has changed to active.

2. The system of claim 1, wherein preferential forwarding statuses of said first set of interfaces and said second set of interfaces are determined based on a role of the first network node configured as the Master node or the Slave node in the corresponding redundancy group.

3. The system of claim 2, wherein
   the preferential forwarding statuses of said first and second interfaces in the first set of interfaces are set as standby when said first network node is configured as Slave in the first redundancy group with respect to the first domain;
   the preferential forwarding statuses of said first and second interfaces in the second set of interfaces are set as active when said first network node is configured as Master in the second redundancy group with respect to the second domain; and
   the preferential forwarding status of said third interface in the first set of interfaces is opposite to the preferential forwarding statuses of said first and second interfaces in the first set of interfaces, and the preferential forwarding status of said third interface in the second set of interfaces is opposite to the preferential forwarding statuses of said first and second interfaces in the second set of interfaces.

4. The system of claim 2, wherein a PW segment between an interface of said first network node and an interface of a remote network node is determined as working status if the preferential forwarding status of the interface of said first network node and the preferential forwarding status of the interface of said remote network node are both active.

5. The system of claim 2, wherein
   in response to a fault of said first network node, said first network node is configured to set its role as Slave both in the first and second redundancy groups, causing one of the at least one second network node to be Master in the first or the second redundancy group.

6. The system of claim 1, wherein said first network node is a switching-provider edge (S-PE) device.

7. A system comprising:
a first network node across a first domain and a second domain; and
at least one second network node across the first domain and the second domain, wherein the first network node and the at least one second network node form a first redundancy group in the first domain and a second redundancy group in the second domain,
wherein said first network node comprises:
a first set of interfaces facing the first domain;
a second set of interfaces facing the second domain; and
a forwarder,
wherein in the first set of interfaces, at least a first interface is configured for connecting with a link within the first domain;
wherein in the second set of interfaces, at least a first and a second interfaces are configured for connecting with pseudowire (PW) segments within the second domain;
wherein a second interface in the first set of interfaces facing the first domain is configured to couple to an interface of the at least one second network node that faces the second domain for transferring traffic between said network node and said at least one second network node and between the first domain and the second domain along a first path;
wherein a third interface of the second set of interfaces facing the second domain is configured to couple to an interface of the second network node that faces the first domain for transferring traffic between said first network node and said at least one second network node between first domain and the second domain along a second path; and
wherein said forwarder is configured for forwarding traffic selectively between one of the first set of interfaces and one of the second set of interfaces,
wherein while the PW segments coupled to the first and second interfaces of the second set of interfaces of the first network node are active:
the first network node is configured to operate as a Master node in the second redundancy group with respect to the second domain and a Slave node in the first redundancy group with respect to the first domain, and
the second network node is configured to operate as a Slave node in the second redundancy group with respect to the second domain and a Master node in the first redundancy group with respect to the first domain,
wherein in response to a fault or error on one of the PW segments coupled to the first or second interfaces in the second set of interfaces of the first network node:
the first network node is configured to:
change from operation as the Master node in the second redundancy group with respect to the second domain to operation as the Slave node in the second redundancy group with respect to the second domain;
advertise that the third interface in the second set of interfaces facing the second domain has changed to active; and
advertise that the first and second interfaces in the second set of interfaces facing the second domain have changed to standby;
the second network node is configured to:
change from operation as the Slave node in the second redundancy group with respect to the second domain to operation as the Master node in the second redundancy group with respect to the second domain; and
advertise that at least one interface facing the second domain has changed to active.

8. The system of claim 7, wherein preferential forwarding statuses of said first set of interfaces and said second set of interfaces are determined based on a role of the first network node configured as the Master node or the Slave node in the corresponding redundancy group.

9. The system of claim 8, wherein
the preferential forwarding statuses of said first interface in the first set of interfaces is set as standby when said first network node is configured as Slave in the first redundancy group with respect to the first domain;
the preferential forwarding statuses of said first and second interfaces in the second set of interfaces are set as active when said first network node is configured as Master in the second redundancy group with respect to the second domain; and
the preferential forwarding status of said second interface in the first set of interfaces is opposite to the preferential forwarding status of said first interface in the first set of interfaces, and the preferential forwarding status of said third interfaces in the second set of interfaces is opposite to the preferential forwarding statuses of said first and second interfaces in the second set of interfaces.

10. The system of claim 8, wherein a PW segment between an interface of said first network node and an interface of a remote network node is determined as working status if the preferential forwarding status of the interface of said first network node and the preferential forwarding status of the interface of said remote network node are both active.

11. The system of claim 8, wherein
in response to a fault on said first network node, said first network node is configured to set its role as Slave both in the first and second redundancy groups, and cause one of the at least one second network node to be Master in the first or second redundancy groups.

12. The system of claim 7, wherein said first network node is a terminating-provider edge (T-PE) device, and said first domain is an attachment circuit (AC) domain.

13. The system of claim 1, wherein:
when the first network node is configured to operate as the Master node in the second redundancy group with respect to the second domain, the third interface in the second set of interfaces is set to standby; and
after the first network node is reconfigured as the Slave node in the second redundancy group with respect to the second domain, the third interface in the second set of interfaces is set to active.

14. The system of claim 13, wherein after the first network node is reconfigured as the Slave node in the second redundancy group with respect to the second domain and the third interface is set to active, the third interface in the second set of interfaces is configured to:
receive data from at least one of the first and second interfaces of the first set of interfaces facing the first domain and transmit the data to the interface of the second network node facing the first domain for transmission to the second domain, or
receive data from the second domain via the interface of the second network node facing the first domain and transmit the data to at least one of the first and second interfaces of the first set of interfaces for transmission to the first domain.

15. The system of claim 7, wherein:
when the first network node is configured to operate as the Master node in the second redundancy group with respect to the second domain, the third interface in the second set of interfaces is set to standby; and
after the first network node is reconfigured as the Slave node in the second redundancy group with respect to the second domain, the third interface in the second set of interfaces is set to active.

16. The system of claim 15, wherein after the first network node is reconfigured as the Slave node in the second redundancy group with respect to the second domain and the third interface is set to active, the third interface in the second set of interfaces is configured to:
receive data from the first interface in the first set of interfaces facing the first domain and transmit the data to the interface of the second network node facing the first domain for transmission to the second domain, or
receive data from the second domain via the interface of the second network node facing the first domain and transmit the data to the first interface of the first set of interfaces for transmission to the first domain.

\* \* \* \* \*